Figure 1:
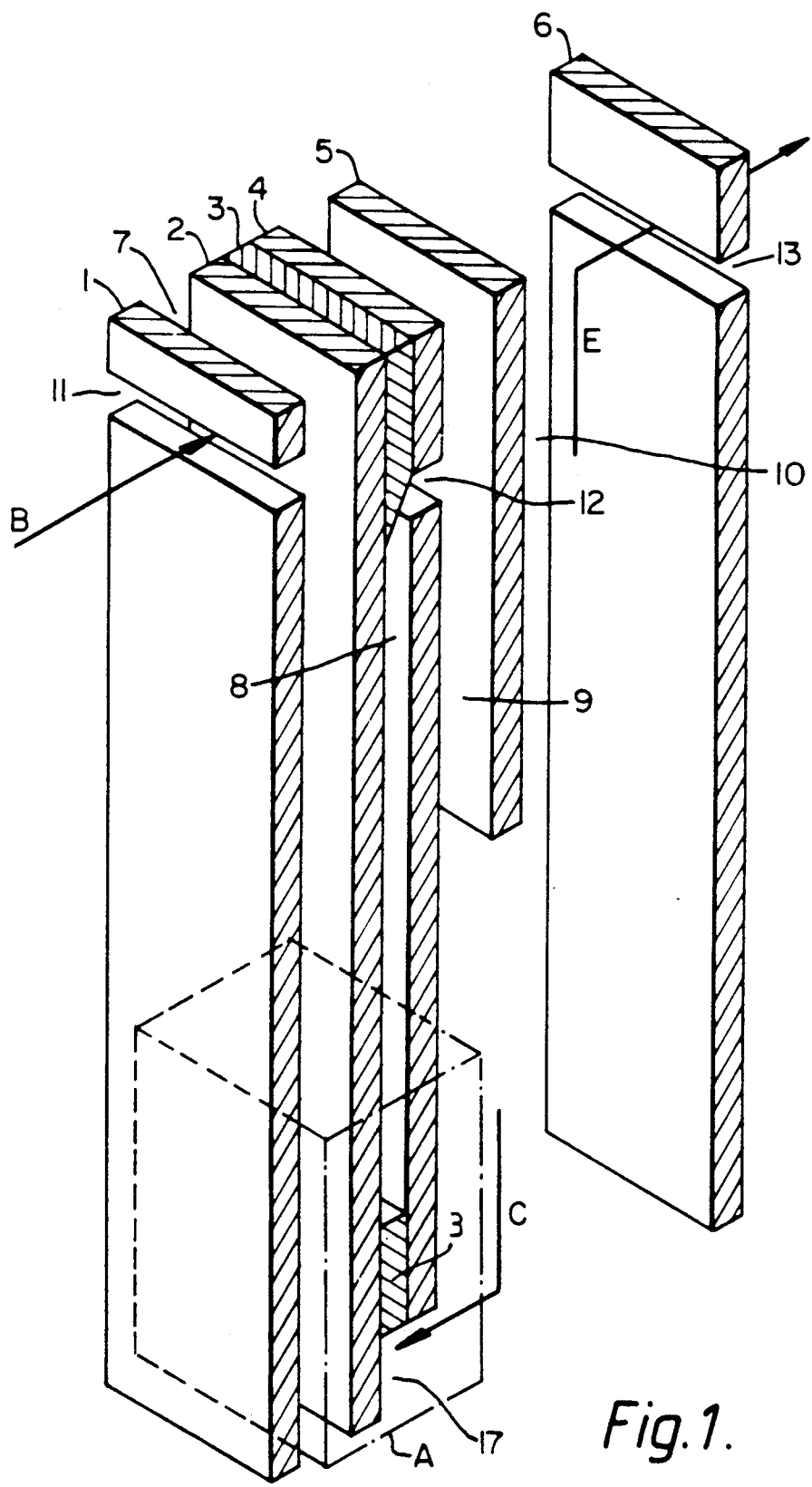

United States Patent [19]

Brattan et al.

[11] Patent Number: 5,034,029

[45] Date of Patent: Jul. 23, 1991

[54] APPARATUS FOR EFFECTING GAS-LIQUID CONTACT

[75] Inventors: Keith Brattan, Chester; Stephen F. Kelham, Cheshire; Morris N. Nevin, Hants, all of England

[73] Assignee: Imperial Chemical Industries PLC, United Kingdom

[21] Appl. No.: 104,587

[22] Filed: Oct. 2, 1987

Related U.S. Application Data

[63] Continuation of Ser. No. 818,759, Jan. 14, 1986, abandoned.

[30] Foreign Application Priority Data

Jan. 18, 1985 [GB] United Kingdom ............... 8501354

[51] Int. Cl.[5] ............................................. B01D 47/00
[52] U.S. Cl. ..................................... 55/84; 55/257.1; 261/123
[58] Field of Search .................... 261/121.1, 78.1, 123; 55/249, 255, 256, 90, 84, 240, 248, 225, 239, 244

[56] References Cited

U.S. PATENT DOCUMENTS

| | | | |
|---|---|---|---|
| 131,266 | 9/1872 | Fuller | 261/121.1 X |
| 1,569,729 | 1/1926 | Duda | 72/45 |
| 2,252,242 | 8/1941 | Wood | 55/249 |
| 2,790,506 | 4/1957 | Van Vactor | 261/121.1 X |
| 3,516,647 | 6/1970 | Jaffe et al. | 55/249 X |
| 3,561,194 | 2/1971 | Baldwin | 55/249 |
| 3,563,029 | 2/1971 | Lowes | 55/239 X |
| 3,647,358 | 3/1972 | Greenberg | 55/244 X |
| 3,953,003 | 4/1976 | Mahig | 261/DIG. 75 |
| 3,993,448 | 11/1976 | Lowery, Sr. | 55/239 X |
| 4,005,999 | 2/1977 | Carlson | 55/95 |
| 4,145,198 | 3/1979 | Laule | 55/439 |
| 4,300,924 | 11/1981 | Coyle | 261/123 X |
| 4,325,923 | 4/1982 | Botton | 423/234 |
| 4,470,830 | 9/1984 | Aubert | 55/249 X |

FOREIGN PATENT DOCUMENTS

| | | |
|---|---|---|
| 2163177 | 1/1977 | Australia . |
| 4383379 | 1/1979 | Australia . |
| 1887676 | 11/1979 | Australia . |
| 275941 | 7/1914 | Austria . |
| 546658 | 3/1932 | Fed. Rep. of Germany . |
| 605869 | 6/1926 | France ................. 261/123 |
| 651030 | 2/1929 | France ................. 55/239 |
| 1569729 | 6/1980 | United Kingdom . |

OTHER PUBLICATIONS

L. M. Yakimenko, "The Production of Hydrogen, Oxygen, Chlorine and Alkali" (1981), pp. 122-124 (English translation of Russian).
V. M. Ramm, "The Absorption of Gases" (1966), pp. 336-340 (English translation of Russian).
V. M. Zimin, G. M. Kamar'yan and A. F. Mazanko, "Chlorine Electrolysers" (1984), pp. 242-244, (English translation of Russian).
The Absorption of Gaseso—Ramm-1966, pp. 336-340.
The Manufacture of Hydrogen, Oxygen, Chlorine and Alkaline Yakimenko-1981, pp. 122-124.
Chlorine Electrolytic Cells-1984-Zimin, et al, pp. 242-244.

Primary Examiner—Bernard Nozick
Attorney, Agent, or Firm—Cushman, Darby & Cushman

[57] ABSTRACT

An apparatus for effecting direct contact between a gas and a liquid which has at least one substantially vertical channel, formed for example by a pair of parallel plates, a port for introducing gas at a lower part of the channel, a port for introducing liquid to the channel, and a port for removing gas and liquid at an upper part of the channel, the height of the channel being substantially greater than the distance between the walls which define the channel such that gas at elevated pressure, when introduced into the channel, can cause liquid to move upwardly in the channel and to be removed from the channel. The apparatus may be associated with an electrolytic cell in which a gas is produced by electrolysis. Also, a process for effecting direct contact between a gas and a liquid is disclosed.

8 Claims, 3 Drawing Sheets

APPARATUS FOR EFFECTING GAS-LIQUID CONTACT

This is a continuation of application Ser. No. 818,759, filed Jan. 14, 1986, which was abandoned, upon the filing hereof.

This invention relates to an apparatus for effecting direct contact between a gas and a liquid, and to a process in which direct contact is effected between a gas and a liquid.

There are many processes in which directly, or indirectly, contact is effected between a gas and a liquid. For example, a gas may be indirectly contacted with a cooling liquid in a heat-exchanger in order to cool the gas, and similarly a liquid may be cooled in such a heat-exchanger by effecting indirect contact with a cooling gas.

Direct contact may be effected between a liquid and a gas in order, for example, to dry the gas, or to absorb the gas in the liquid to form a solution therein, or to strip from the liquid a gas which is in admixture with the liquid, or to effect evaporation of the liquid. Such direct contact between a liquid and a gas may be effected in a number of different ways. For example, the gas may be bubbled through a pool of liquid, or streams of the gas and liquid may be contacted in a counter-current manner, for example by passing the liquid downwardly through a column and the gas upwardly through the column. The column may have plates therein, or it may be packed in order to effect intimate contact between the gas and the liquid.

Where such known processes for effecting direct or indirect contact between a gas and a liquid are carried out it is necessary to provide means for circulating the gas and/or the liquid, and means for transferring the gas and/or liquid to and from the apparatus in which contact between the gas and liquid is effected. Such means may be provided by a pump or a plurality of pumps.

The present invention relates to an apparatus suitable for effecting direct contact between a gas and a liquid which is of simple construction and which does not depend on the provision of pumps to circulate the gas and/or liquid, or to transfer the gas or liquid to or from the apparatus, or which at least reduces the number of such pumps which are necessary. Thus, maintenance of the apparatus in which such direct contact between a gas and liquid is effected is simplified as the number of moving parts such as pumps is reduced, or such moving parts are eliminated entirely.

According to the present invention there is provided an apparatus suitable for effecting direct contact between a gas and liquid which apparatus comprises at least one substantially vertical channel, means for introducing gas at a lower part of the channel, for example, at or near the base of the channel, means for introducing liquid to the channel, and means for removing gas and liquid at an upper part of the channel, for example, at or near the top of the channel, the height of the channel being substantially greater than the distance between the walls thereof which define the channel such that gas at elevated pressure, when introduced into the channel, can cause liquid to move upwardly in the channel and to be removed from the channel.

There is also provided a process for effecting direct contact between a gas and a liquid in an apparatus which comprises at least one substantially vertical channel, means for introducing gas and liquid at a lower part of the channel, for example at or near the base of the channel, means for introducing liquid to the channel, and means for removing gas and liquid at an upper part of the channel, for example at or near the top of the channel, in the apparatus the height of the channel being substantially greater than the distance between the walls thereof which define the channel, the process comprising introducing gas at elevated pressure and liquid to the channel, causing the liquid to move upwardly in the channel, and removing gas and liquid from the channel.

In the process the gas and liquid pass upwardly, concurrently, in the channel.

The liquid may be caused to pass upwardly by a gas lift effect, in which case the dimensions of the channel, and in particular the height of the channel in relation to the distance between the walls thereof, should be chosen in order to obtain the gas lift effect where this is the sole means of causing the liquid to move upwardly in the channel.

Where the liquid is caused to move upwardly in the channel by a gas lift effect the means for introducing liquid to the channel may suitably be at a lower part of the channel, for example, at or near the base of the channel.

Alternatively the liquid may be caused to move upwardly in the channel by means of a static head acting on the liquid in the channel. In this case also the means for introducing liquid to the channel may suitably be at a lower part of the channel, for example, at or near the base of the channel, although this is not necessarily so.

The liquid may be caused to move upwardly in the channel by means of a combination of a gas-lift effect and a static head acting on the liquid in the channel.

The channel in the apparatus should be substantially vertical, at least in the case where liquid is caused to move upwardly in the channel by means of a gas lift effect. The channel need not be precisely vertical. However, where it is desired to operate the process by the gas lift effect the channel should not be displaced from a vertical position by such an amount that in use a gas lift effect cannot be obtained, or cannot be sustained.

The channel in the apparatus may be formed, for example, of a pair of spaced apart plates and end walls separating the plates. The spaced apart plates may be parallel, or substantially parallel to each other. Alternatively, the channel may be formed by the annular space between a pair of tubes of differing diameters, which tubes may be concentric or substantially concentric.

The means for introducing gas and liquid to the channel may be an aperture or apertures, for example, at or near the base of the channel. Separate apertures may be provided for introduction of gas and of liquid. The aperture or apertures may be in the base of the channel or in a wall which defines the channel at a position at or near the base of the channel, e.g. in one of the spaced apart plates. Similarly, the means for removing gas and liquid from the channel may be an aperture or apertures at the top of the channel or in a wall which defines the channel at a position at or near the top of the channel, e.g. in one of the spaced apart plates. Gas and liquid may be removed via separate apertures.

The dimensions of the channel must be chosen such that liquid introduced into the channel can be caused to move upwardly in the channel. These dimensions will depend at least in part on the means by which the liquid is caused to move upwardly in the channel. For example, where the liquid is caused to move upwardly in the channel at least in part by a gas lift effect these dimensions will depend at least in part on pressure of the gas and the rate at which the gas is introduced into the channel, and on the density and viscosity of the liquid and on the rate at which the liquid is introduced into the channel. In general the height of the channel will be substantially greater than the distance between the walls which define the channels. Thus, where the channel is formed by a pair of substantially parallel plates separated by end walls the height of the channel, that is the height of the plates, will be substantially greater than the distance between the plates. Where the channel is formed by a pair of substantially concentric tubes the height of the channel, that is the height of the tubes, will be substantially greater than the distance between the tubes. The dimensions of the channel may be chosen by means of experiment bearing in mind the factors referred to above.

The apparatus may comprise a plurality of channels which are adjacent to each other and which are interconnected at least some of the channels being provided with means for introducing gas and liquid thereto and with means for removing gas and liquid therefrom. Not all of the channels may be provided with the said means. For example, a first channel may be provided with means for introducing gas and liquid thereto and with means for removing gas and liquid therefrom and be interconnected to a second channel adjacent thereto. In the second channel the gas and liquid may be separated, the gas being removed therefrom or passed to another channel adjacent thereto, e.g. via an aperture at or near the top thereof, and the liquid passing to the bottom of the channel. This liquid may, for example, be recirculated to the first channel for re-use therein, or it may be passed to a third channel adjacent thereto in which it may be contacted with a gas, which may be the same or different, and caused to move upwardly in the channel e.g. by the gas lift effect.

The flow of gas and liquid through such an apparatus comprising a plurality of interconnected channels may be in a co-current or counter-current manner.

The apparatus comprising a plurality of channels may be formed by three or more plates which may be parallel or substantially parallel and which have end walls separating adjacent plates and which may have apertures in the faces thereof which provide means for introducing gas and liquid to the channels and means for removing gas and liquid from the channels.

The apparatus comprising a plurality of channels may be formed by at least two spaced apart plates which may be parallel or substantially parallel to each other, and end walls separating adjacent plates, in which a spacer or plurality of spacers are positioned between adjacent plates and spaced apart from each other and which, together with the spaced apart plates, form the channels in the apparatus. The spacers may have apertures therein to provide the required interconnection between the adjacent channels. In this embodiment the apparatus of the invention may include three or more spaced apart plates, one or more of the plates defining apertures therein in order to provide interconnection between a channel positioned between one pair of parallel plates and an adjacent channel or channels positioned between another pair of parallel plates.

In an alternative embodiment the apparatus comprising a plurality of channels may be formed of a plurality of tubes of differing diameters which are positioned concentrically or substantially concentrically, and which have apertures in the faces thereof which provide means for introducing gas and liquid to the channels and means for removing gas and liquid from the channels.

The apparatus of the present invention which comprises a plurality of channels which are adjacent to each other and which are interconnected is a preferred embodiment of the present invention. In such a preferred apparatus a plurality of separate functions may be carried out. For example, in a first channel a gas may be contacted with a first liquid in order to remove impurities from the gas, in a second channel the gas may be separated from the first liquid, and in a third channel the gas may be contacted with a second liquid in order to dry the gas.

The apparatus of the present invention which comprises a plurality of channels which are adjacent to each other and which are interconnected is preferably formed of a plurality of plates positioned substantially parallel to each other and having appropriately positioned apertures therein which provide the necessary interconnection between the adjacent channels. Such an apparatus is readily produced and is of simple construction. The plates may be fixed to each other by a variety of different techniques. For example, the plates may be bolted to each other, or they may be bonded to each other, e.g. by the use of a suitable adhesive or, in the case where they are formed of a metal or of an organic polymeric material, by welding to each other, e.g. by heat welding.

A variety of different processes may be effected in the apparatus of the present invention. Such processes include, for example, drying of a gas by direct contact with a liquid, absorption of a gas in a liquid, directly contacting a first gas with a liquid in order to remove from the liquid a second gas admixed therewith, directly contacting a gas with a liquid in order to evaporate the liquid, cooling of a gas by contact with a liquid, purifying of a gas by contact with a liquid, and effecting chemical reaction between a gas and a liquid. A plurality of such processes may be effected in an apparatus of the invention, for example, by use of an apparatus comprising a plurality of channels and contacting a gas with different liquids in the separate channels of the apparatus.

The apparatus of the invention is particularly suitable for use in the treatment of gases which are produced in the electrolysis of an electrolyte, e.g. an aqueous electrolyte. An apparatus of the invention may be operatively connected to an electrolytic cell which cell comprises at least one anode and at least one cathode and which is provided with means for introducing to the apparatus a gas or gases produced in the electrolytic cell. The apparatus may be used in a facility which comprises a plurality of electrolytic cells and the gaseous products from an electrolytic cell may be treated in an apparatus associated with each electrolytic cell. Alternatively, the gaseous products from a plurality of electrolytic cells may be combined and treated in an apparatus of the invention. The electrolytic cell may comprise a separator positioned between each anode and adjacent cathode. The separator may be a cation-exchange membrane and the electrolytic cell may be of the filter press type.

The apparatus of the invention is particularly suitable for use in the treatment of chlorine and hydrogen in gaseous form which are produced in the electrolysis of aqueous alkali metal chloride solution. The apparatus is particularly suitable for use in the treatment of gases which are produced at elevated pressure, for example chlorine and hydrogen which may be produced under elevated pressure in an electrolytic cell as no additional pressurization of the gases may be necessary before use in the apparatus, the pressure of the gases, such as the chlorine and hydrogen from the electrolytic cell, being sufficient, for example, to provide the required gas lift effect in the process of the invention.

Treatments of gaseous chlorine and hydrogen which may be effected include the following, cooling by direct contact of the gas with a liquid, e.g with water, and drying of the gaseous chlorine, e.g. by direct contact of the chlorine with sulphuric acid.

In the apparatus it is not necessary that contact between, or separation of, a gas and liquid be effected in all the channels. One or more of the channels in the apparatus may comprise a further component. For example, when a gas, e.g. chlorine or hydrogen, has been cooled by contact with a liquid the liquid entrained in the gas may be removed by passing the gas through a fibrous filter contained in one of the channels. A channel may contain a bed of material comprising a catalyst or on which absorption of a gas may be effected An embodiment of the invention will now be described with the aid of the following drawings in which FIG. 1 is an isometric view, partly in cross-section of a part of an apparatus of the invention, FIG. 2 is an isometric view, partly in cross-section, of that part of the apparatus of FIG. 1 outlined at A, and FIG. 3 is a cross-sectional view in elevation of a part of an apparatus of the invention.

Figure 2:
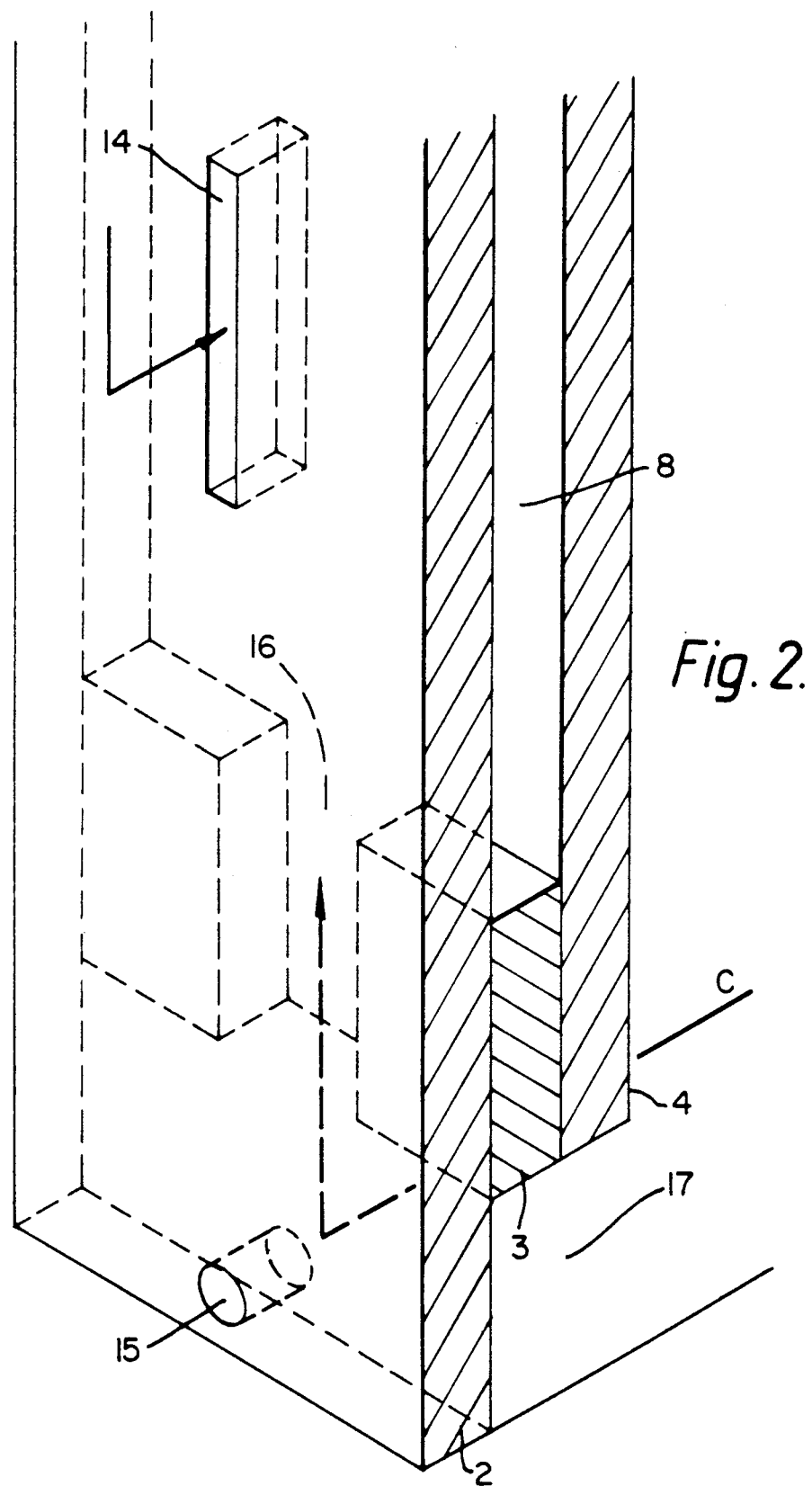
Figure 3:
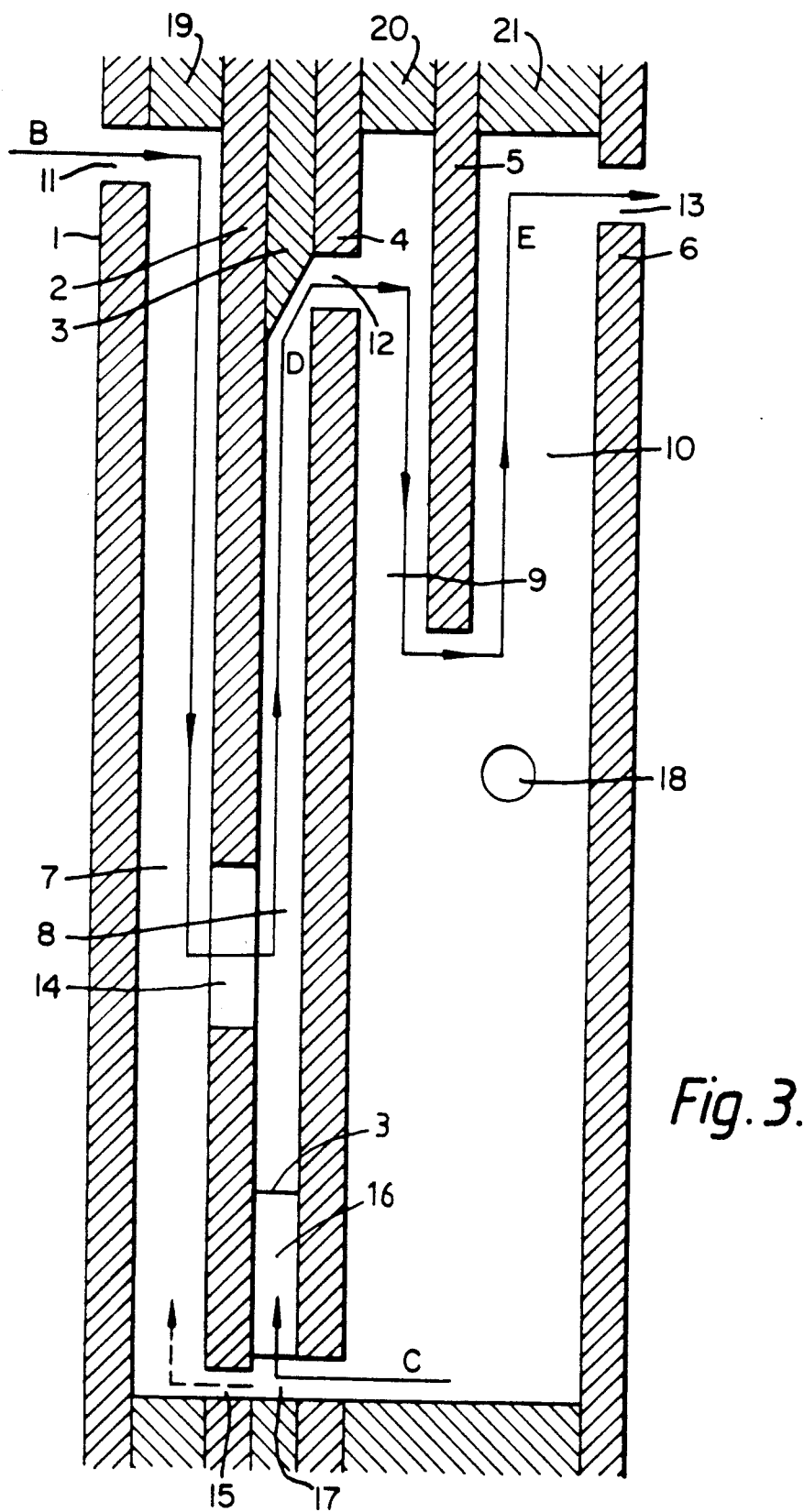

In FIG. 1 to 3 there is illustrated an apparatus of the invention which comprises a plurality of plates 1, 2, 3, 4, 5, 6 which together define a plurality of channels 7, 8, 9, 10. For the sake of convenience and ease of illustration, in the apparatus of FIG. 1 the end walls between adjacent plates which together with the plates define the channels have been omitted, as have top and bottom walls positioned between adjacent plates.

Referring to FIG. 1 the plate 1 comprises an aperture 11, the plate 4 comprises an aperture 12, and the plate 6 comprises an aperture 13.

Referring to FIG. 2, which illustrates in detail that part of the apparatus of FIG. 1 outlined at A the plate 2 contains an aperture 14 leading from one side of the plate 2 to the other and providing a passageway between channels 7 and 8. Plate 2 also comprises an aperture 15 leading from one side of the plate to the other.

Plate 3 defines a passageway 16 which is vertically positioned. Plates 3 and 4 define an aperture 17 which is formed by the plates 3 and 4 being shorter than the plate 2.

Referring to FIG. 3 the apparatus comprises an outlet port 18 and spacers 19, 20, 21 which space apart adjacent plates and which serve to form part of the top, bottom and side walls of the apparatus.

In operation gas under pressure, for example from an electrolytic cell, enters the channel 7 via the aperture 11, passes downwardly in the channel 7 in the direction indicated by arrow B, and into channel 8 via aperture 14. Liquid, from a reservoir at the lower end of the space between the plates 4 and 6 passes through aperture 17 in the direction indicated by arrow C and then passes upwardly through passageway 16 into channel 8. The gas and liquid pass upwardly in channel 8 in the direction indicated by arrow D and through aperture 12 into channel 9. Upward passage of the liquid in channel 8 is assisted in part by a gas lift effect provided by the gas and in part by a head of liquid provided by the reservoir of liquid at the lower end of the space between the plates 4 and 6. Aperture 15 serves to provide a liquid balancing effect.

After passage through the aperture 12 the gas and liquid separate, and the gas passes upwardly in channel 10 in the direction of arrow E and thence through aperture 13 in plate 6. The liquid which has separated from the gas falls in passage 9 to form a reservoir of liquid at the lower end of the space between plates 4 and 6. The liquid is then recycled via aperture 17 to channel 8 and contacted with more gas entering channel 8 via aperture 14. An excessive head of liquid in the space between plates 4 and 6 is prevented as any excess liquid is removed from the apparatus via port 18.

If desired, the apparatus may comprise many more spaced apart plates having apertures therein such that the gas may be contacted with a plurality of different liquids.

The apparatus of the invention is suitable for use, for example, in the purification and drying of chlorine and/or hydrogen produced in an electrolytic cell in which aqueous alkali metal chloride solution is electrolysed. In this case, an apparatus may be connected to the chlorine outlet from the cell and an apparatus to the hydrogen outlet from the cell.

We claim:

1. An apparatus for effecting direct contact between a gas and a liquid comprising:
   means defining a housing having side walls, an upper wall and a bottom wall;
   means for introducing gas into the housing;
   at least a pair of spaced apart planar plates which are substantially parallel to each other and which define the walls of at least one substantially vertical channel;
   means for introducing gas at a lower portion of said channel provided by an aperture in one of said plates;
   means for introducing liquid at a lower portion of said channel provided by an aperture in one of said plates;
   means for removing gas and liquid at an upper portion of said channel provided by an aperture or apertures in said plate or plates, the height of said channel being substantially greater than the distance between the walls thereof such that gas at elevated pressure, when introduced into said channel, causes liquid to move upwardly in said channel and to be removed from said channel; and 2. An apparatus as claimed in claim 1 which comprises at least two spaced apart plates which are parallel or substantially parallel to each other, and end walls separating adjacent plates, in which a spacer or a plurality of spacers are positioned between adjacent plates and spaced apart from each other and which, together with the spaced apart plates, form the substantially vertical channels in the apparatus, the spacers having apertures therein for introduction of gas and liquid to said channels and for removal of gas and liquid from said channels.

3. An apparatus as claimed in claim 1 which comprises a plurality of substantially vertical channels which are adjacent to each other, which are formed by a plurality of spaced apart planar plates, and which are interconnected, at least some of the channels being provided with means formed by apertures in said planar plates for introducing gas and liquid thereto and for removing gas and liquid therefrom.

4. An apparatus as claimed in claim 3 which comprises at least three spaced apart plates which are parallel or substantially parallel to each other and which have end walls separating adjacent plates.

5. An apparatus as claimed in claim 3 which comprises three spaced apart plates in which a plate has apertures therein to provide an interconnection between a channel positioned between one pair of substantially parallel plates and a channel positioned between another pair of substantially parallel plates adjacent thereto.

6. A process for effecting direct contact between a gas and a liquid in an apparatus which comprises:
 means defining a housing having side walls, an upper wall and a bottom wall;
 means for introducing gas into the housing;
 at least a pair of spaced apart planar plates which are substantially parallel to each other and which define the walls of at least one substantially vertical channel;
 means for introducing gas at a lower portion of said channel provided by an aperture in one of said plates;
 means for introducing liquid at a lower portion of said channel provided by an aperture in one of said plates;
 means for removing gas and liquid at an upper portion of said channel provided by an aperture or apertures in said plate or plates, the height of said channel being substantially greater than the distance between the walls thereof such that gas at elevated pressure, when introduced into said channel, causes liquid to move upwardly in said channel and to be removed from said channel; and
 means for removing gas from the housing,
 said process comprising introducing gas into the housing, introducing gas at elevated pressure and liquid to said channel, causing said liquid to move upwardly in said channel, removing gas and liquid from said channel and removing gas from the housing.

7. A process as claimed in claim 6 in which the liquid is caused to pass upwardly in the channel by a gas lift effect.

8. A process as claimed in claim 6 in which the liquid is caused to pass upwardly in the channel by means of a static head of liquid.

* * * * *